United States Patent [19]

Rodolakis

[11] 4,351,539

[45] Sep. 28, 1982

[54] TRASH BARREL

[75] Inventor: Michael S. Rodolakis, Worcester, Mass.

[73] Assignee: AMS Industries, Inc., Worcester, Mass.

[21] Appl. No.: 173,768

[22] Filed: Jul. 30, 1980

[51] Int. Cl.3 .................................................. B62B 1/00

[52] U.S. Cl. .................................. 280/47.26; D34/5; D34/25; 206/519; 220/1 T

[58] Field of Search ..................... 280/47.26; 220/1 T; 206/518, 519, 520; D34/5, 25

[56] References Cited

U.S. PATENT DOCUMENTS

| | | | |
|---|---|---|---|
| D. 218,359 | 8/1970 | Marsh | D34/5 |
| D. 231,184 | 4/1974 | Brown et al. | D34/5 |
| 962,025 | 6/1910 | Holloway | 280/47.26 |
| 1,014,475 | 1/1912 | Holloway | 280/47.26 |
| 2,606,586 | 8/1952 | Hill | 206/518 X |
| 3,179,332 | 4/1965 | Brighton et al. | 280/47.26 X |
| 3,346,271 | 10/1967 | Parsons | 280/47.26 X |
| 3,366,397 | 1/1968 | Zeilstra et al. | 280/47.26 |

*Primary Examiner*—Joseph F. Peters, Jr.
*Assistant Examiner*—Donald W. Underwood
*Attorney, Agent, or Firm*—Blodgett & Blodgett

[57] ABSTRACT

Barrel consisting of a container manufactured in one piece of plastic with a bottom wall formed to provide a pedestal for resting on the ground as well as recesses to receive a pair of wheels, the container being tapered and the wheels being entirely included with an envelope of the surface of the container so that it is nestable with a similar container.

4 Claims, 4 Drawing Figures

TRASH BARREL

BACKGROUND OF THE INVENTION

It is common practice, particularly in maintenance operations, to use integrally-formed plastic barrels for holding trash and carrying it to various places. It is also known to provide such a barrel with a pair of wheels for ease in moving it from one place to another. While such wheeled trash barrels are very convenient, they suffer from the disability that they cannot be nested. The nesting operation becomes important in shipping, since otherwise a large number of containers would occupy a very large volume that is inconsistent with their value. Also, in displaying such trash barrels at the retail level, would be desirable to nest them to save both storage and display space. The prior art wheeled barrels could not be assembled at the factory and, when received at the retail store, placed on the sale floor immediately without a secondary operation. These and other difficulties experienced with the prior art devices have been obviated in a novel manner by the present invention.

It is, therefore, an outstanding object of the present invention to provide a trash barrel which normally rests securely on a floor surface, but on occassion can be wheeled from one place to another.

Another object of the invention is the provision of a trash barrel which is provided with wheels and which, nevertheless, may be nested with similar containers.

A further object of the present invention is the provision of a wheeled trash barrel which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the present invention consists of a trash barrel having a single-piece plastic container with tapered sidewalls and a bottom wall. The bottom wall is formed with a downwardly-extending pedestal along one side adapted to engage the ground and with an abutment extending laterally from the pedestal directly across the bottom wall. A pair of wheels is rotatably mounted on opposite sides of the abutment. The wheels are generally tangential to a ground plane including the lower surface of the pedestal. The wheels are also generally tangential to a plane of extension of a side wall, so that the wheels lie entirely within an envelope defined by the side wall surfaces and the ground surface.

More specifically, the abutment is formed with an edge surface that curves from a side wall to the pedestal, so that, when the container is tilted about the axis of the wheels, all portions of the container are lifted and only the wheels contact the ground.

BRIEF DESCTIPTION OF THE DRAWINGS

The character of the invention, however, may be best understood by reference to one of its structural forms, as illustrated by the accompanying drawings, in which:

FIG. 1 is a perspective view of a trash barrel embodying the principles of the present invention, FIG. 2 is a side elevational view of the trash barrel, FIG. 3 is a front elevational view of the trash barrel, and FIG. 4 is a bottom plan view of the trash barrel.

DESCRIPTION OF THE PREFERRED EMBODIMENT

Figure 1:
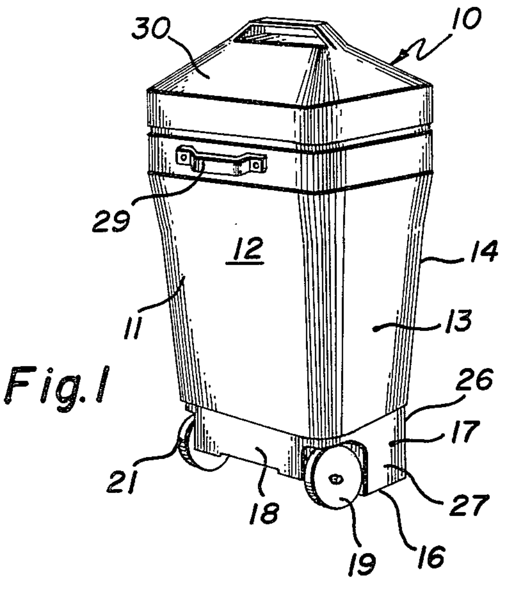

Referring first to FIG. 1, wherein are best shown the general features of the invention, the trash barrel, indicated generally by the reference numeral 10, is shown as comprising a single-piece plastic container 11 having tapered sidewalls 12, 13, 14, and 15 terminating in a bottom wall 16. The bottom wall 16 is formed with a downwardly-extending pedestal 17 extending along the sidewall 14 and adapted to engage the ground 22. The bottom wall 16 is also formed with an abutment 18 which extends laterally from the pedestal across the bottom wall. A pair of wheels 19 and 21 are rotatably mounted on the opposite sides of the abutment.

Figure 2:
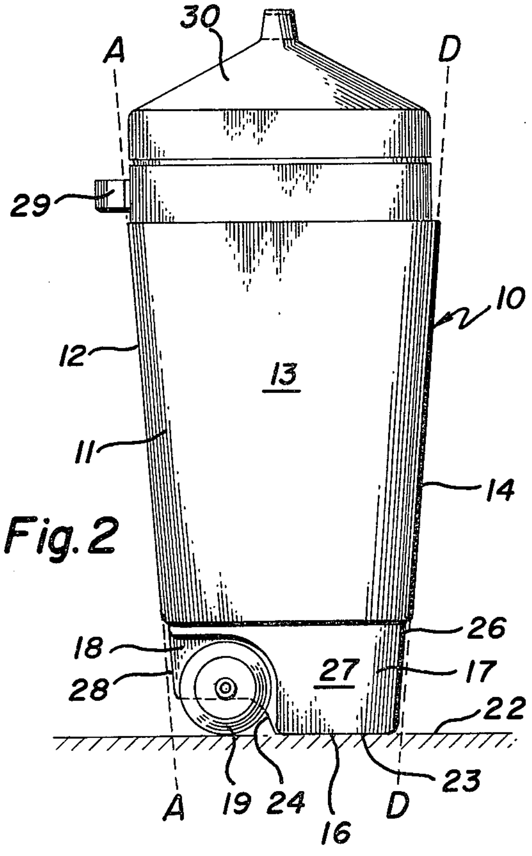

Referring now to FIG. 2, it can be seen that the wheels are generally tangential to the ground plane 22, including the lower surface 23 of the pedestal 17. The wheels are also generally tangential to a plane A—A which constitutes an extension of the sidewall 12. The wheels, therefore, are entirely within an envelope defined by the outer surface of the sidewalls and the ground surface 22. The five planes which define the envelope within which the wheels 19 and 21 are enclosed, are shown in the drawings as planes A—A, B—B, C—C and D—D, as well as the ground surface 22.

Figure 3:
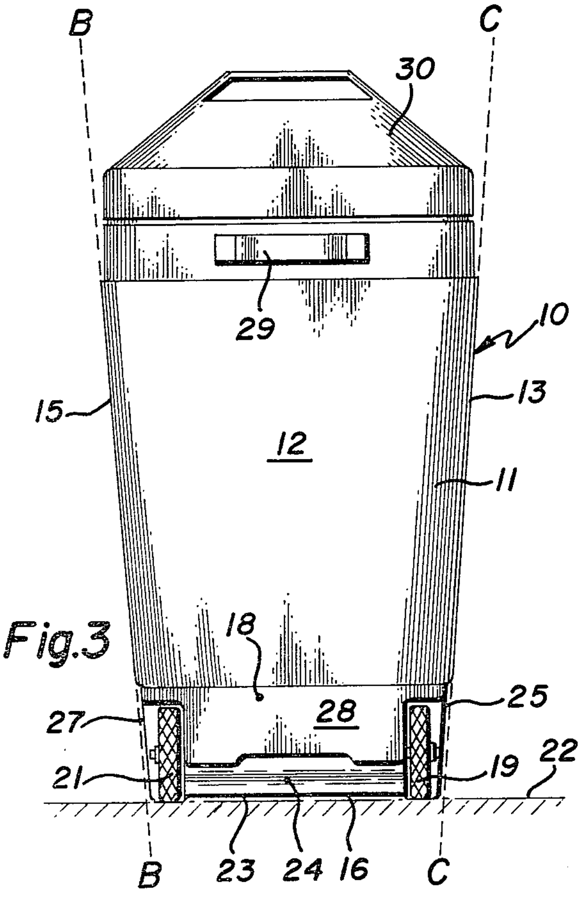
Figure 4:
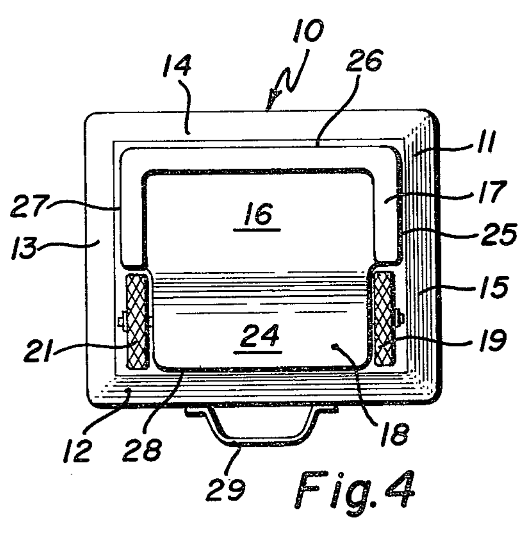

Referring now to FIGS. 2, 3, and 4, it can be seen that the abutment 18 is formed with an edge surface 24 that curves from the sidewall 12 to the pedestal 17. When the container 11 is tilted about the axis of the wheels 19 and 21, all portions of the container are lifted from the ground 22 and only the wheels contact the ground.

The bottom wall 16 is formed with four lower sidewalls 25, 26, 27 and 28 which might be considered generally as extensions of the previously-mentioned sidewalls 15, 14, 13 and 12, respectively. However, the outer surfaces of these lower sidewalls are spaced inwardly of and parallel to their corresponding sidewalls. A handle 29 is mounted on the upper portion of the sidewall 12 that extends above the wheels 19 and 21. This is so that the act of pulling the handle 29 causes the container 11 to tilt about the wheel axis and to lift the pedestal 17 from the ground. A cover 30 is provided to fit snugly over the top edge of the container 11.

The operation and the advantages of the present invention will now be readily understood in view of the above description. The fact that the sidewalls 12, 13, 14 and 15 of the container 11 are tapered allows the container to be nestable with similar containers. The fact that the wheels 19 and 21 lie entirely within the silhoutte of the container means that the nesting operation can be carried out while still maintaining the effectiveness of having a wheel available for transport of the trash barrel. This function is possible because of the use of the curved surface 24 in the abutment 18 which permits tilting of the container about the wheel axis. In addition, the nesting capability is rendered more effective by the use of the recess in the bottom wall 16 of the container. This is formed by placing the bottom lower sidewalls 25, 26, 27 and 28 in a location which is spaced inwardly and parallel to their respective upper sidewalls. Naturally, the cover 30 is removed before the nesting operation is attempted. One of the advantages of the invention is that the wheels can be assembled with the container at the factory. There is no loss of "packing cube" when it is assembled. The arrangement also allows the weight of the container and contents to be spread along the sidewalls and not at a principal point, such as the bottom of the container, where with thin-walled containers it would cause damage. The wheels do not rest on the bottom of the next lower container; on the contrary, the weight of each container is carried on the side walls of the container under it. In other words, the containers, when nested, are supported by the sidewalls of the previous container and the wheels do not touch the bottom of the supporting container.

It can be seen, then, that the present invention has the advantage that it is capable of being nested for storage, for transport in large quantities, and for display at a point of sale. The function of being able to roll the container from one place to another is not lost because of the nesting capability. This is due to the novel shape of the bottom wall 16, of the pedestal 17, and the abutment 18 which form the bottom wall. A commercial embodiment of the invention, a 32 gallon barrel, is capable of being shipped in a lot of 800 pieces in a 900 cubic foot truck, or of 1550 pieces in a 4400 cubic foot railroad car. The container was made from a high-density polyethlene blended with ultra-violet inhibitor to prevent cracking in the sunlight.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Trash barrel, comprising:

(a) a single-piece plastic container having four upper tapered side walls, four lower tapered side walls which are generally extensions of the upper side walls, but are spaced inwardly of and parallel with the upper side walls, and a bottom surface, said four lower side walls forming a downwardly-extending pedestal adapted to engage the ground, and an abutment extending laterally from the pedestal, the bottom of said abutment being higher than the bottom of the pedestal, and the opposite outer side surfaces of the abutment being spaced inwardly of the respective outer opposite side surfaces of the pedestal, and (b) a pair of wheels rotatably mounted on the opposite side surfaces of the abutment, the wheels being generally tangential to a ground plane including the bottom of the pedestal and lying entirely within an envelope defined by the planes of the outer surfaces of the upper side walls and the ground surface, so that, when the trash barrel is nested with other identical trash barrels, the trash barrel is supported by contact of its upper side walls only with the upper side walls of the next lower trash barrel and the wheels do not contact the lower side walls of said next lower trash barrel.

2. Trash barrel as recited in claim 1, wherein the bottom of the abutment is connected to the bottom of the pedestal by a curved surface.

3. Trash barrel as recited in claim 2, wherein a handle is mounted on the upper portion of the side wall extending above the wheels, so that pulling on the handle causes the container to rotate about the wheel axis and lift the pedestal from the ground.

4. Trash barrel as recited in claim 3, wherein a cover fits snugly over the top edge of the container.

* * * * *